United States Patent [19]

Kazurov et al.

[11] Patent Number: 5,479,280

[45] Date of Patent: Dec. 26, 1995

[54] ACTIVE MATRIX FOR LIQUID CRYSTAL DISPLAYS HAVING TWO SWITCHING MEANS AND DISCHARGING MEANS PER PIXEL

[75] Inventors: Boris I. Kazurov; Oleg F. Ogurtsov; Gennadi Y. Krasnikov; Boris P. Chernorotov, all of Moscow, Russian Federation

[73] Assignee: Goldstar Co., Ltd., Seoul, Rep. of Korea

[21] Appl. No.: 166,938

[22] Filed: Dec. 15, 1993

[30] Foreign Application Priority Data

Dec. 30, 1992 [RU] Russian Federation ............. 92015543

[51] Int. Cl.[6] .................................................. G02F 1/1343
[52] U.S. Cl. .................................... 359/59; 359/49; 359/60
[58] Field of Search .......................................... 359/49, 60

[56] References Cited

U.S. PATENT DOCUMENTS

| 4,890,097 | 12/1989 | Yamashita et al. | 340/719 |
| 4,930,874 | 6/1990 | Mitsumune et al. | 350/333 |
| 5,191,322 | 3/1993 | Katayama et al. | 359/60 |

FOREIGN PATENT DOCUMENTS 6102535   9/1992   Japan ........................................ 359/59

*Primary Examiner*—William L. Sikes
*Assistant Examiner*—Fetsum Abraham
*Attorney, Agent, or Firm*—Finnegan, Henderson, Farabow, Garrett & Dunner

[57] ABSTRACT

An active matrix for liquid crystal displays having a plurality of picture elements, a plurality of address buses to which an address signal having a high signal level and a low steady state signal level is applied, and a plurality of data buses orthogonal to the address buses. Each picture element includes at least one display electrode device; a first switching device coupled between the display electrode device and a first respective one of the address buses and a respective one of the data buses; and a second switching device coupled between the display electrode device and a second respective one of the address buses and the respective data bus. The second switching device includes a device for preventing the display electrode from discharging whereby a substantially same voltage is maintained at the display electrode during the time when the address signal changes from the high level to the low level.

7 Claims, 8 Drawing Sheets

ACTIVE MATRIX FOR LIQUID CRYSTAL DISPLAYS HAVING TWO SWITCHING MEANS AND DISCHARGING MEANS PER PIXEL

BACKGROUND OF THE INVENTION

A. Field of the Invention

This invention relates to liquid crystal displays with active matrices and more particularly to active matrix LCDs capable of compensating for flicker effects caused the switching transistor therein.

B. Description of the Related Art

Recently, demands for liquid crystal displays (hereinafter referred to as "LCD") with high image quality for computers technique and consumer electronics applications have greatly increased. It is known that LCDs with an active matrix which employs thin film switching transistors (hereinafter referred to as "TFTs") as switching elements provides high image quality. See Laid-open Japanese patent application, N 60-192369, H01L 29/78, for example.

Referring to FIG. 1, such an active matrix LCD includes a plurality of address buses 1-1, 1-2, 1-3, ..., 1-n; a plurality of data buses 2-1, 2-2, 2-3, ..., 2-m orthogonal to the address buses; and a plurality of picture elements in a matrix of n rows and m columns. Each picture element is surrounded by a pair of adjacent address buses and a pair of adjacent data buses. Each picture element includes a TFT 3 and a display electrode 4. The display electrode 4 is coupled to a corresponding address bus and a corresponding data bus through the TFT 3. More specifically, for each picture element, the drain of the TFT 3 is connected to adjacent data bus; the gate to an adjacent address bus; and the source to the display electrode 4. Such an active matrix LCD has low operational reliability and low image quality because the presence of defects in the signal bus during the manufacture cause the picture elements to fail to perform.

To improve the operational reliability of the active matrix LCD, it is known to provide redundancy in the circuit element in the active matrix. See Demand de brevet d' invention, N 2582431 G09F 3/20, for example. Referring to FIG. 2, to correct the above failure caused by the defective signal bus, each picture element of the circuitry for such an active matrix LCD includes a second "redundant" TFT 5 in addition to a first TFT 3 in that the display electrode 4 is now coupled to two address buses adjacent the picture element: the first of the two address buses through the first TFT 3 and the second of the two address buses through the second TFT 5. Such an approach improves the operational reliability of the picture element because when one of the two address buses becomes defective, the display electrode of the picture element can still be connected to the remaining nondefective address bus through a respective one of the two switching transistors, thus obtaining the video signal from the data bus.

However, this approach also has drawbacks in that flicker effects caused by the capacitance inherent between the gate and source of the switching transistor affect the voltage of the display electrode 4. For example, FIG. 3 shows a schematic of the circuitry corresponding to the TFT 3. A reference numeral 1 refers to the data bus, and U1 the video signal applied thereto; 2 the address bus, and U2 the address signal applied thereto; 6 the liquid crystal (LC) cell capacitor formed between the display electrode 4 (of FIG. 2) and an LCD common electrode (not shown); and 7 a parasitic capacitor formed between the gate and source of the TFT 3. Uo refers to the voltage applied to the LCD common electrode which may be equal to a common "ground" voltage (i.e., zero).

FIG. 4 shows a voltage waveform for U1, U2, and Ud, where Ud refers to the voltage at the display electrode 4. T refers to the time period of the address signal U2, and t the width of a positive pulse having a peak to peak voltage U2m of the address signal U2. When such a positive pulse of the address signal U2 is applied to the gate of the TFT 3, the TFT 3 is activated, and accordingly the resistance of the channel formed between the drain and source of the TFT 3 decreases to the extent that the display electrode is charged to the voltage level of the video signal U1 supplied thereto from the data bus 1.

During the time that the positive pulse of the address signal U2 is supplied to the TFT 3, the parasitic capacitor 7 is charged to a voltage difference of (U1–U2) and the LC cell capacitor 6 is charged to a voltage difference of (U1–Uo). Thereafter, when the address signal changes from the high state (i.e., U2m) of the positive pulse to a low steady state, the TFT 3 is deactivated and the capacitors 6 and 7 are recharged in that, the video signal voltage at the display electrode 4 changes by an amount %U:

$$\%U = (U2 * C7)/(C6+C7) \tag{1}$$

where C6 is the capacitance of the LC cell capacitor 6 and C7 that of the parasitic capacitor 7.

During the time period T, if the video signal applied to the data bus signal U1 has a positive polarity, the absolute voltage value at the display electrode Ud becomes U1–%U; however, if the video signal U1 has a negative polarity, the absolute voltage value at the display electrode becomes U1+%U. Therefore, even if the video signal having a same absolute voltage value is applied to the data bus during the time period T, the voltage value at the display electrode (i.e., applied to the liquid crystal cell) of the LCD may differ from that of the video signal U1, depending on the polarity of the video signal. Consequently, brightness of the LCD image obtained may vary, creating undesirable flicker effects and thus degrading the image quality transmitted.

SUMMARY OF THE INVENTION

The object of the present invention is to overcome the above mentioned problem by providing an active matrix for liquid crystal displays having a plurality of picture elements, a plurality of address buses to which an address signal having a high signal level and a low steady state signal level is applied, and a plurality of data buses orthogonal to the address buses. Each picture element includes at least one display electrode means; a first switching means coupled between the display electrode means and a first respective one of the address buses and a respective one of the data buses; and a second switching means coupled between the display electrode means and a second respective one of the address buses and the respective data bus. The second switching means includes means for preventing the display electrode from discharging whereby a substantially same voltage is maintained at the display electrode during the time when the address signal changes from the high level to the low level.

The objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to the preferred embodiment of the invention, examples of which are illustrated in the accompanying drawings. Wherever possible, the same reference numbers will be used throughout the drawings to refer to the same or like parts.

Figure 5:
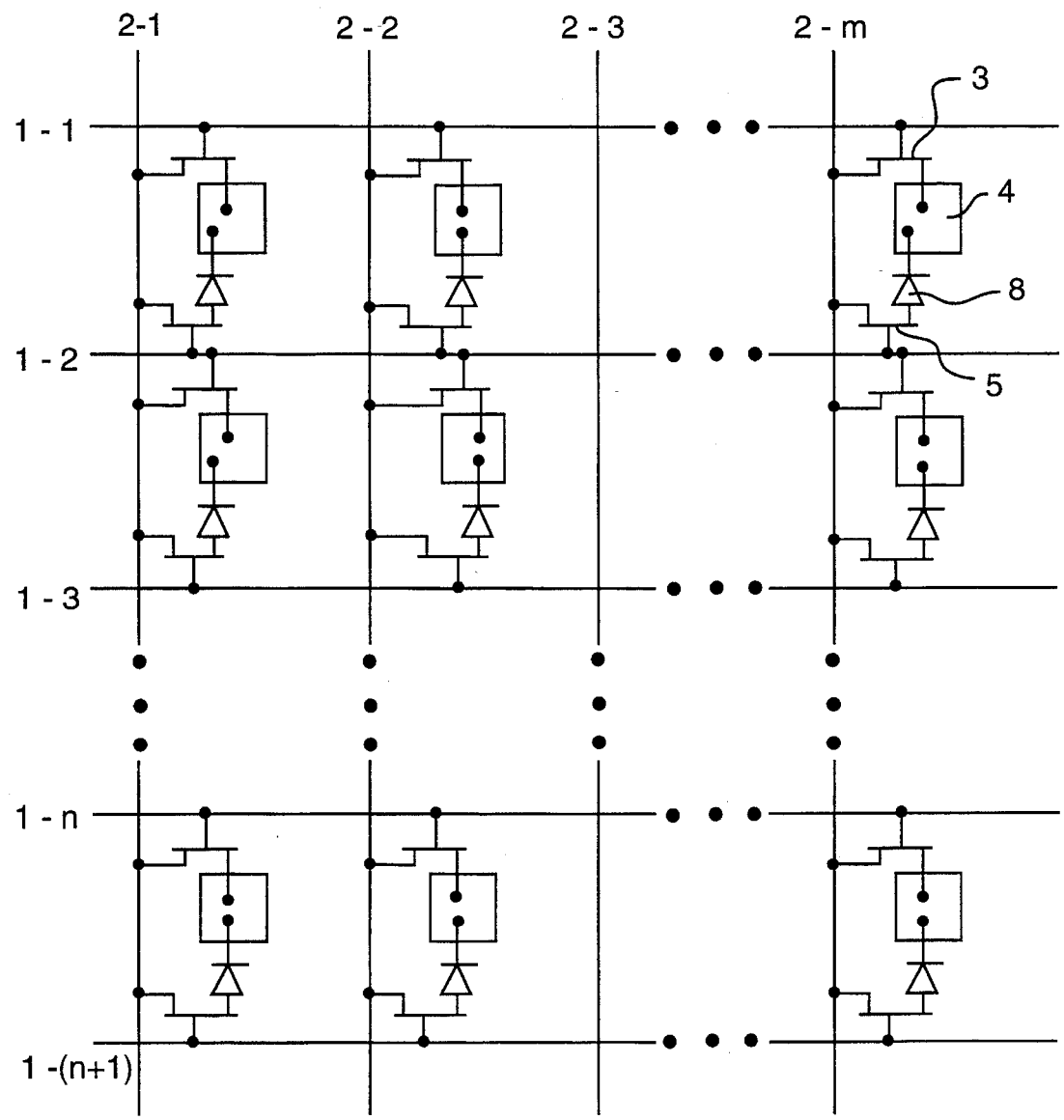
FIG. 5 is the circuitry for an active matrix LCD according to a first embodiment of the present invention.

FIG. 5 shows the circuitry for an active matrix LCD according to a first embodiment of the present invention. The matrix includes a plurality of picture elements in n rows and m columns orthogonal to one another. Each picture element includes the display electrode 4; the first TFT 3; the second TFT 5; and a diode 8. The matrix includes a plurality of address buses 1-1, 1-2, 1-3, . . . , 1-n, 1-(n+1), and data buses 2-1, 2-2, 2-3, . . . , 2-(m+1). The display electrode 4 is coupled to two adjacent address buses. For example, it is coupled to a first adjacent address bus 1-1 through the first TFT 3 and to a second adjacent address bus 1-2 through the second TFT 5. The display electrode 4 is coupled to an adjacent data bus 2-m through both the first and second TFT 3 and 5.

Figure 1:
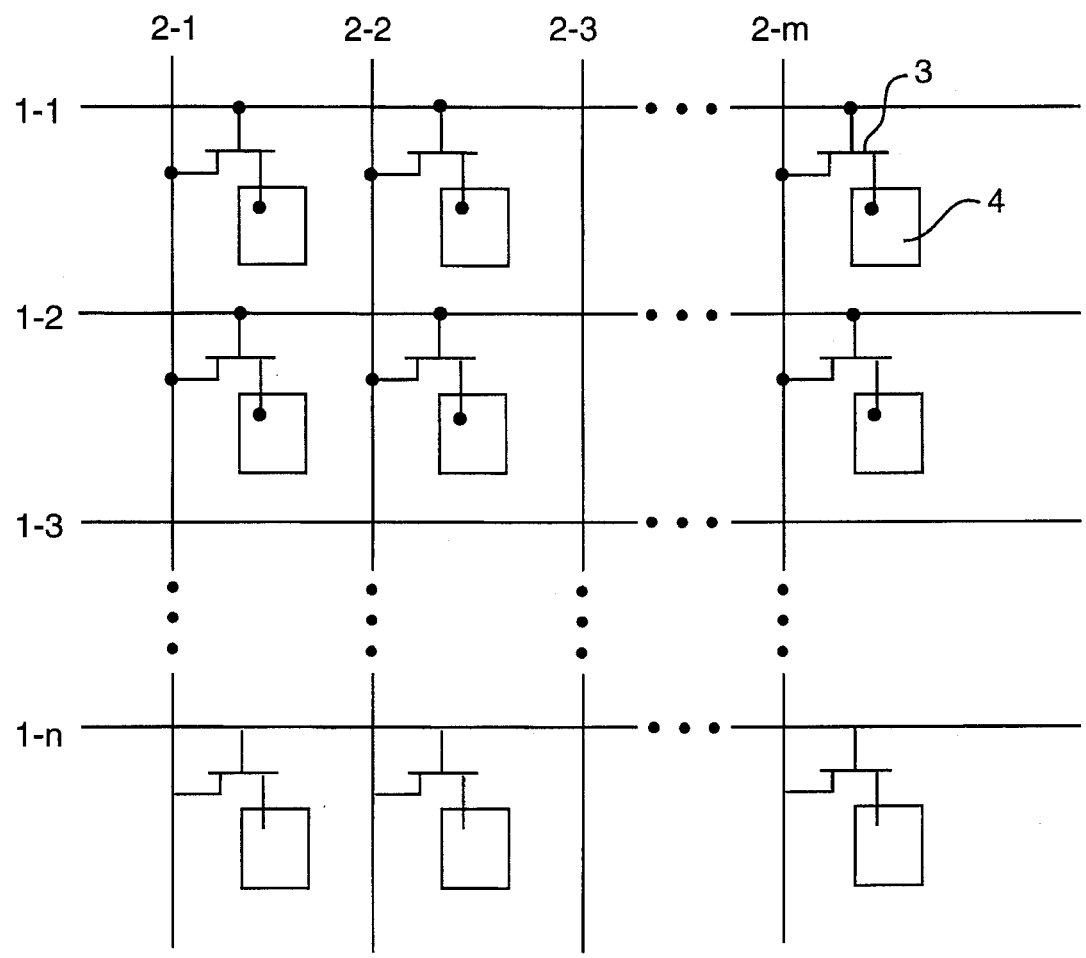
FIG. 1 is the circuitry for a known active matrix LCD.
Figure 2:
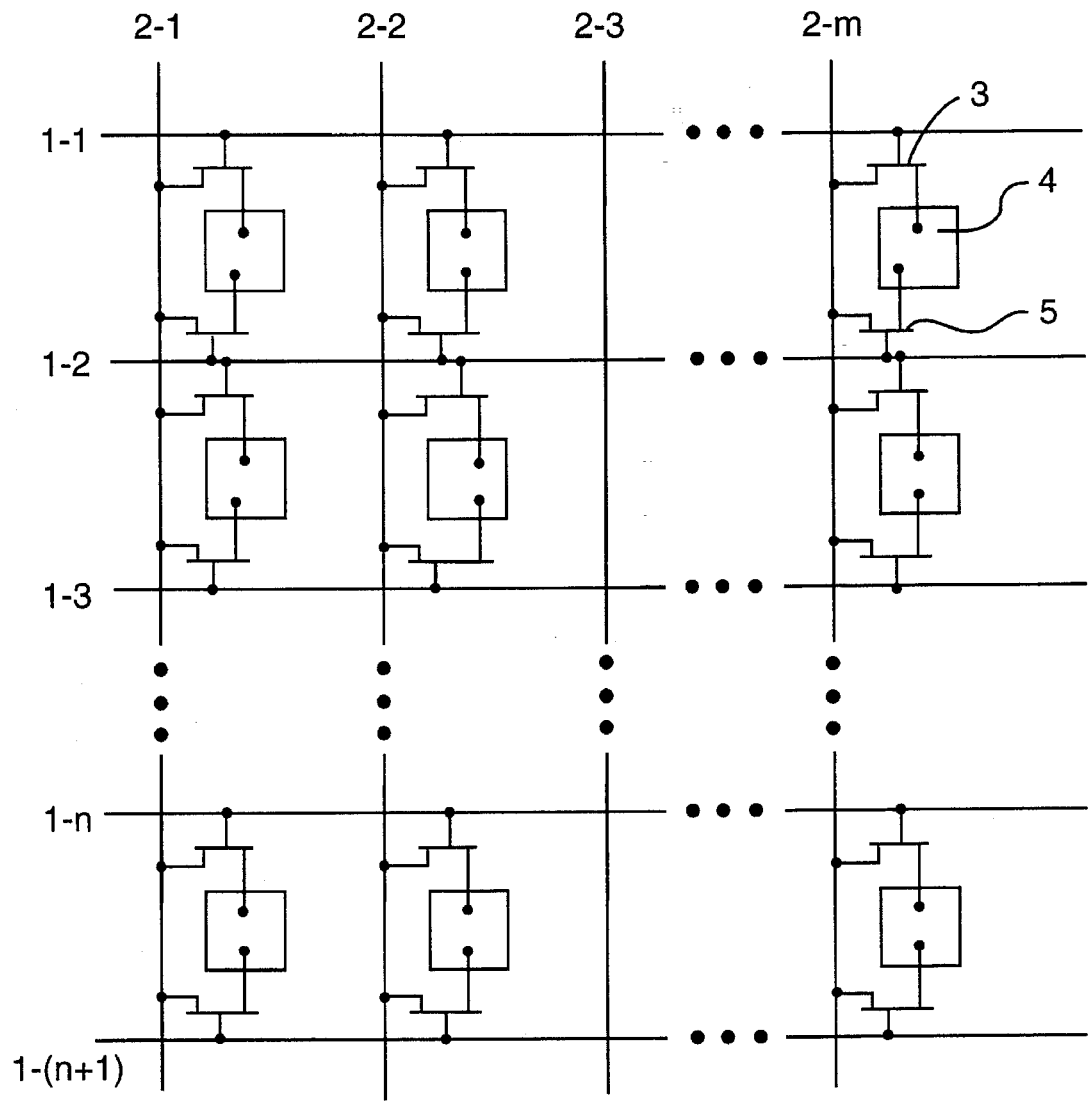
FIG. 2 is the circuitry for a known active matrix LCD with redundancy.
Figure 3:
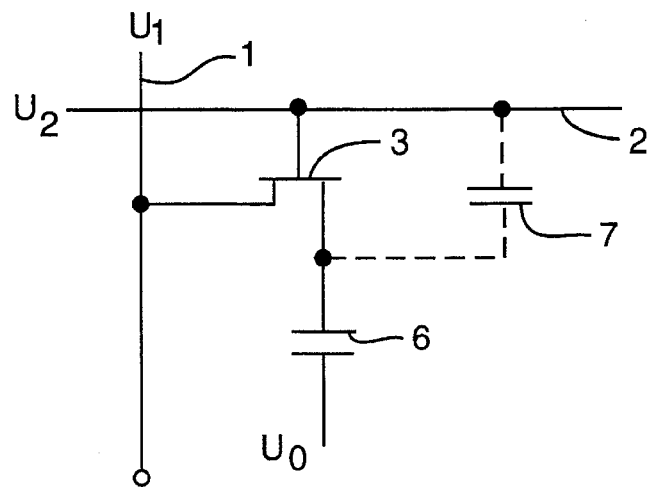
FIG. 3 is a circuit schematic corresponding to a portion of the matrix of FIG. 2.

The structure of FIG. 5 is different from that of FIG. 2 in that the diode 8 is disposed between the display electrode 4 and the second TFT 5. More specifically, the drain of each of the TFTs 3 and 5 is connected to the data bus 2-m; the gate of the first TFT 3 to the first address bus 1-1; the gate of the second TFT 5 to the second address bus 1-2; and the source of the first TFT 3 to the display electrode. The diode 8 is disposed between the source of the second TFT 5 and the display electrode. The drain and source of each of the TFTs 3 and 5 may be interchanged.

Figure 4:
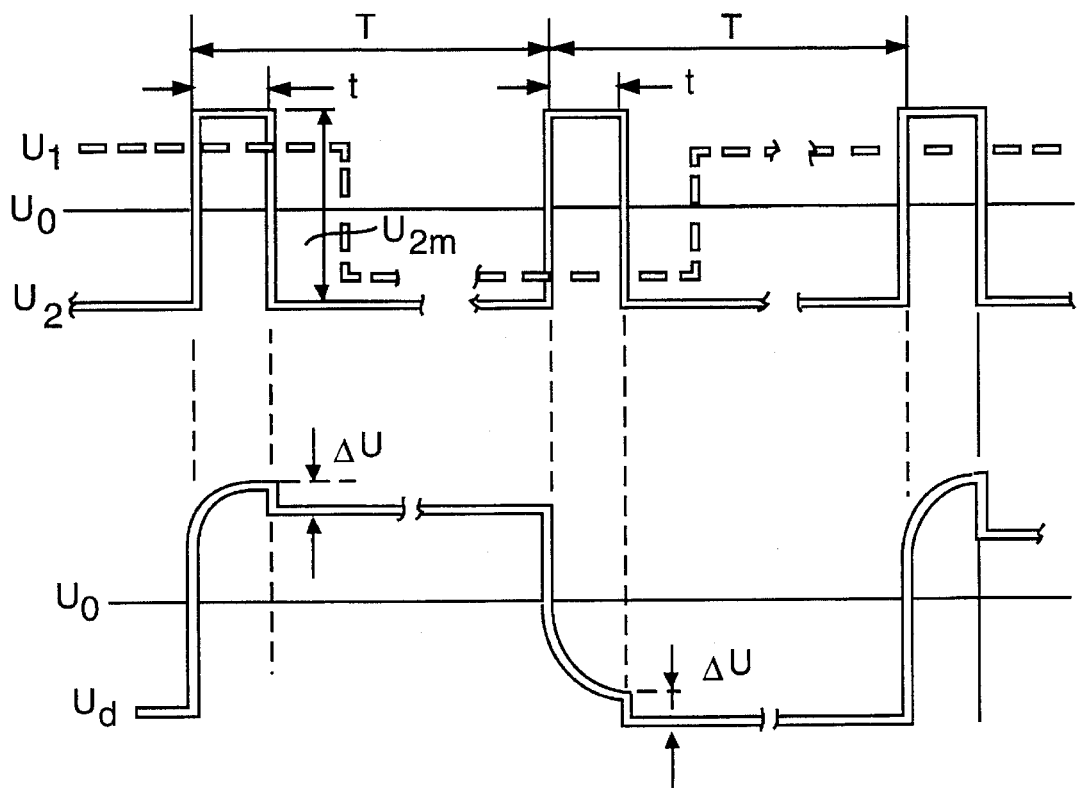
FIG. 4 shows voltage waveforms associated with the circuit schematic of FIG. 3.

The operation of the active matrix of the present invention, as embodied herein, is explained below in reference to FIG. 4. The address signal U2 having a time period T is successively supplied to each address bus in time sequence in a manner shown in FIG. 4. In the first time period T, during a time duration t when the positive pulse of the address signal is applied to the first address bus 1-1, the display electrode 4 is electrically connected to the data bus 2-m through the first TFT 3.

In the second time period T immediately following the first time period T, during the time duration t when the next positive pulse of the address signal is applied to the second address bus 1-2, the display electrode 4 is connected to the data bus 2-m through the second TFT 5 and the diode 8. During the first time period T, the display electrode 4 is charged through the TFT 3 to the voltage U1–%U, and then during the second time period T, the display electrode is recharged through the second TFT 5 and the diode 8 to the voltage U1 because the diode 8 prevents the capacitor 6 from discharging.

Figure 6:
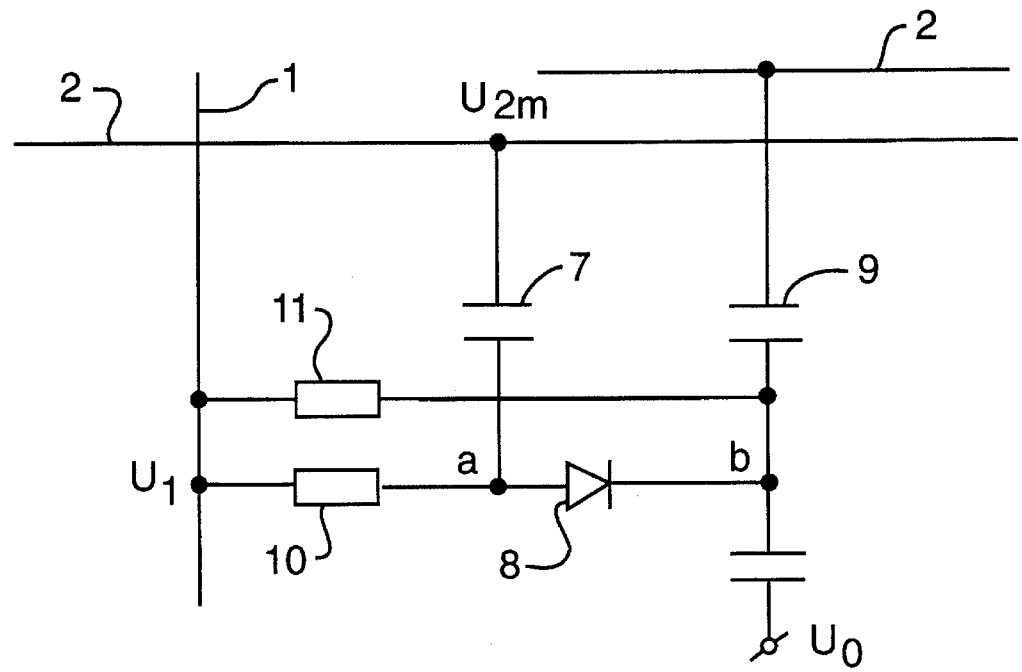
FIG. 6 is a circuit schematic corresponding to a portion of the matrix of FIG. 5 under one condition.
Figure 7:
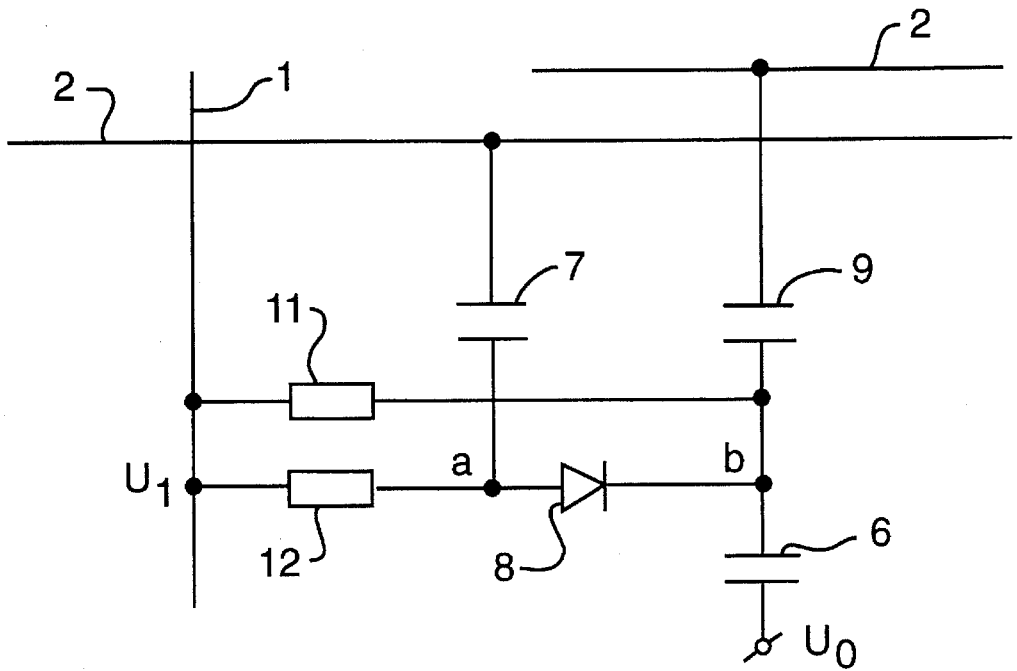
FIG. 7 is a circuit schematic corresponding to a portion of the matrix of FIG. 5 under another condition.

FIG. 6 shows a functional circuit schematic of a liquid crystal (LC) cell of the matrix of the present invention during the time when the address signal is applied to the gate of the second TFT 5. FIG. 7 shows the same during the time when the address signal is absent, due to defects in the second address bus 1-2, at the gate of the second TFT 5. Charging and discharging of the liquid crystal cell capacitor is explained below in reference to FIGS. 6 and 7.

A reference number 6 refers to the LC cell capacitor; 7' a parasitic capacitor formed between the gate and source of the second TFT 5; 9 a parasitic capacitor formed between the gate and source of the first TFT 3. 10 refers to the resistor formed between the drain and source of the second TFT 5 and 11 that of the first TFT 3. Ra refers to the resistance value of the resistor 5 when the associated TFT is activated. Rb refers to the resistance value when the associated TFT is deactivated.

Referring to FIG. 6, during the time when the pulse having the voltage level U2m of the address signal is supplied to the gate of the second TFT 5, the capacitors 6, 7', and 9 are charged to the video signal voltage U1, which voltage appears at points "a" and "b" through the resistor 10, since a time constant (Ra*C6)<<t, i.e., the width of the pulse of the address signal. C6 refers to the capacitance of the capacitor 6. In this case the capacitor C7' (i.e., parasitic capacitor formed between the gate and source of the second TFT 5) is charged to the voltage of U1–U2m.

Referring to FIG. 7, a reference numeral 12 refers to the resistor formed between the drain and source of the second TFT 5 with the resistance value Rb when the second TFT 5 is deactivated. When the voltage of the address signal changes from U2m to a low steady state voltage, the voltage at the point "a" of FIG. 7 decreases to the value U1–U2m; the diode 8 is deactivated; and the resistance of the resistor 12 increases to the value Rb. Then the voltage at the point "a" increases to the value U1 with a time constant of (Rb*C7'), while the voltage U1 at point "b" remains practically the same since the diode 8 remains in a "turned off" nonconductive state. C7' refers to the capacitance of the capacitor 7'.

The display electrode 4 is charged to the voltage value U1 of the video signal of the data bus through the second TFT 5 and the diode 8, and this voltage value remains unchanged during the remainder of the time period T. Since the diode 8 is included between the source of the second TFT 5 and the display electrode 4, recharging of the capacitor 6 and 9 is prevented.

For the diode 8, pin diodes, Schottky diodes and MIS transistors with the gate and drain connected to one another can be used. For a combined structure of the second switching transistor 8 and the diode 8, a thin film transistor with a Schottky diode or a MIS (Metal Insulator Semiconductor) transistor with the gate and drain connected to one another is simple in design and in technology.

Figure 8:
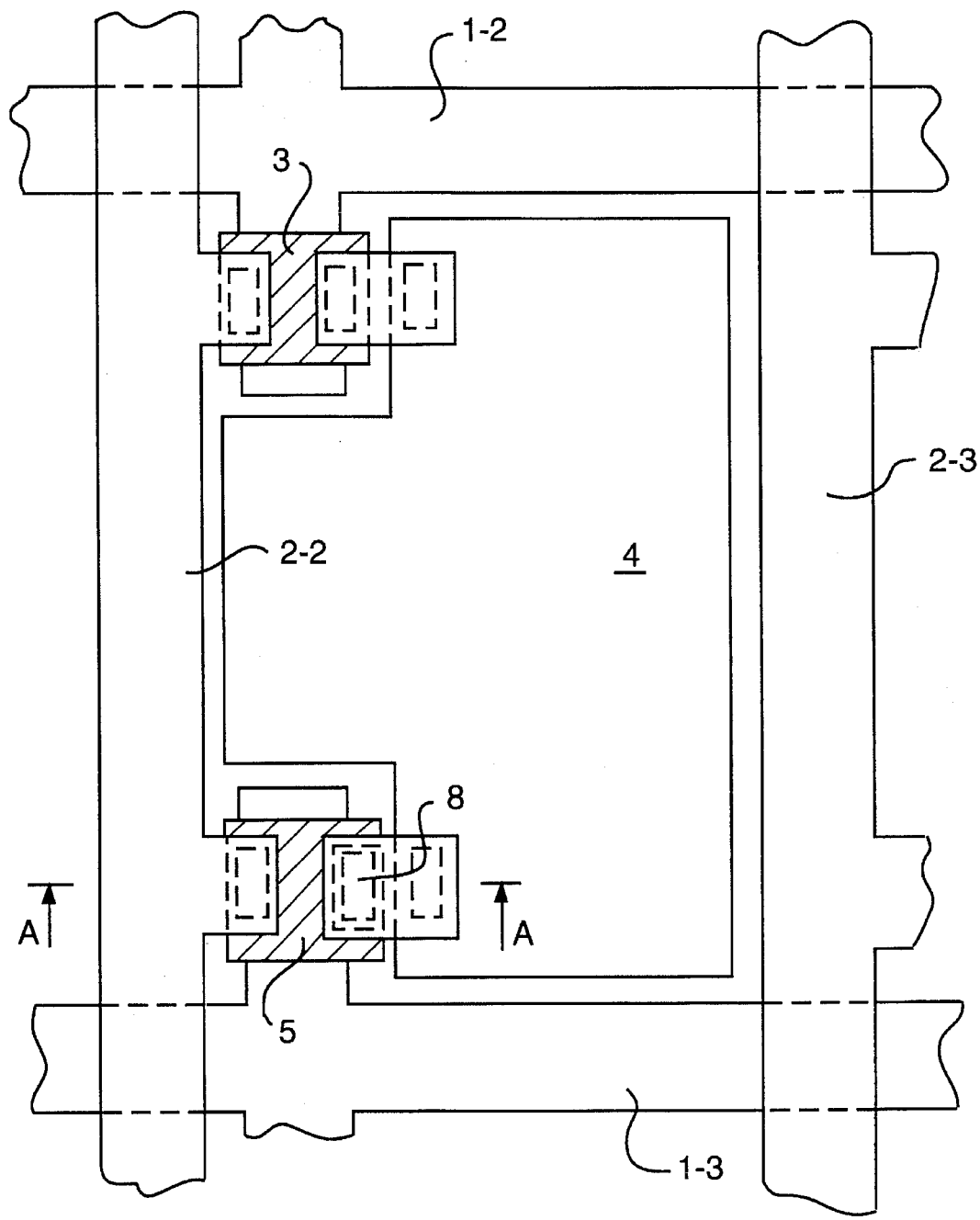
FIG. 8 is a plan view of the layout of a portion of the active matrix LCD of FIG. 5.
Figure 9:
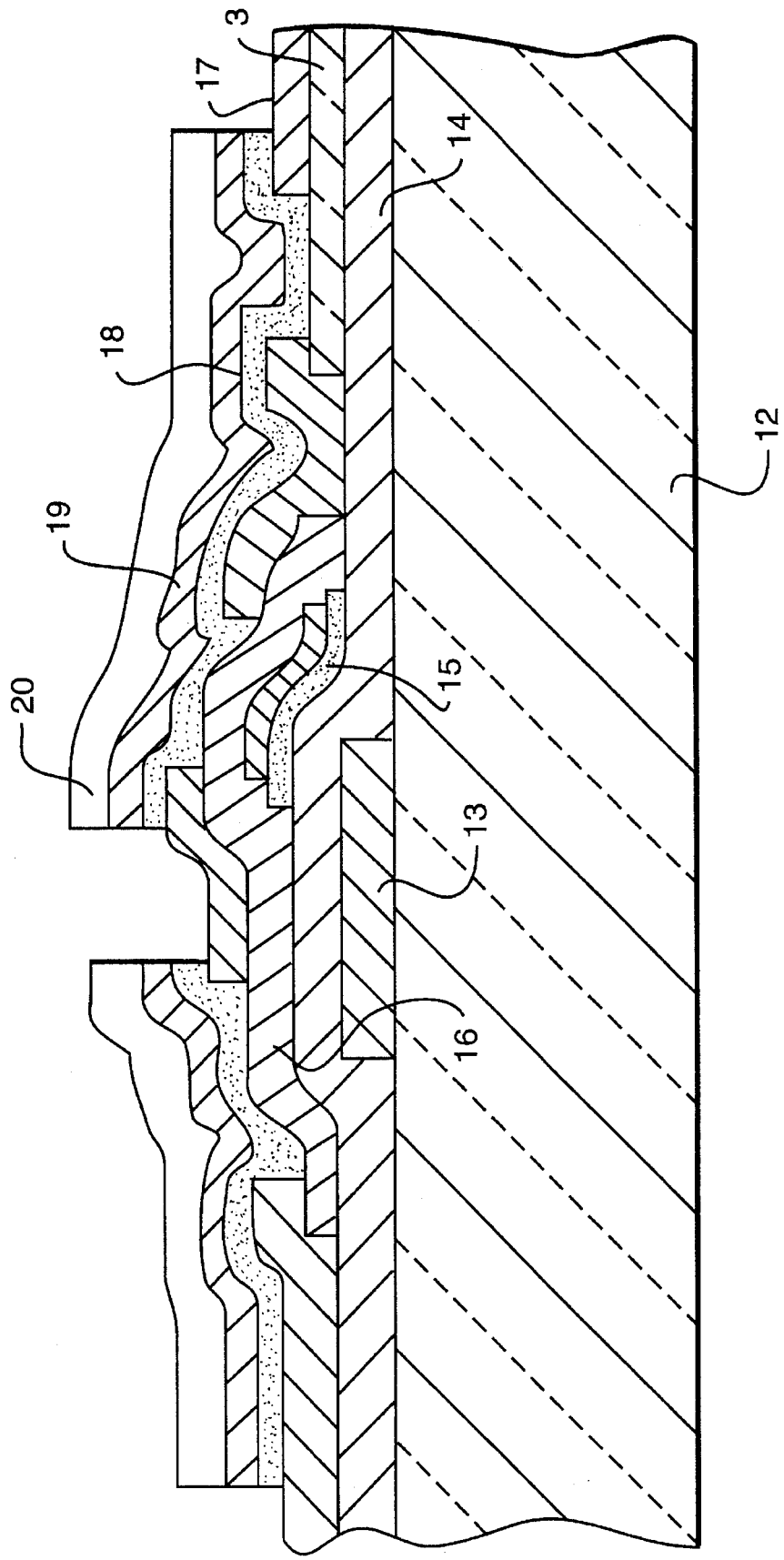
FIG. 9 is a sectional view taken along A—A' of FIG. 8.

An exemplary manufacturing process for the active matrix of the present invention having a Schottky diode is explained below in reference to FIGS. 8 and 9. FIG. 8 shows a layout of a part of the active matrix LCD of FIG. 5 corresponding to a picture element. Reference numerals 3 and 5 refer to the first and second TFTs, respectively; 4 to the display electrode; 1-2 and 1-3 to the address buses; 2-2 and 2-3 to the data buses; 8 to the Schottky diode. The hatched areas represent an amorphous silicon film. FIG. 9 is a cross sectional view along A—A' of FIG. 8.

Referring to FIG. 9, a chromium film was evaporated on an insulator substrate 12. The address buses (not shown) and gates 13 of the switching transistors were formed photolithographically from this film. Then, a silicon nitride film 14 was deposited for a gate dielectric. Thereafter, a $N^+$a-SiH film and a chromium film were deposited and a source contact 15 of the switching transistor 5 was formed using photolithography. The source contact 15 serves simultaneously as a contact for the Schottky diode.

Then, an amorphous silicon film 16 was deposited and the semiconductor areas of the switching transistors were formed photolithographically from this film. Thereafter, a transparent conducting indium oxide film was deposited and the display electrodes 3 were formed photolithographically from this film. Then, $N^+$a-SiH 18, chromium 19 and aluminum 20 films were deposited. The data buses and links between the display electrodes and the switching transistors were formed photolithographically.

Figure 10:
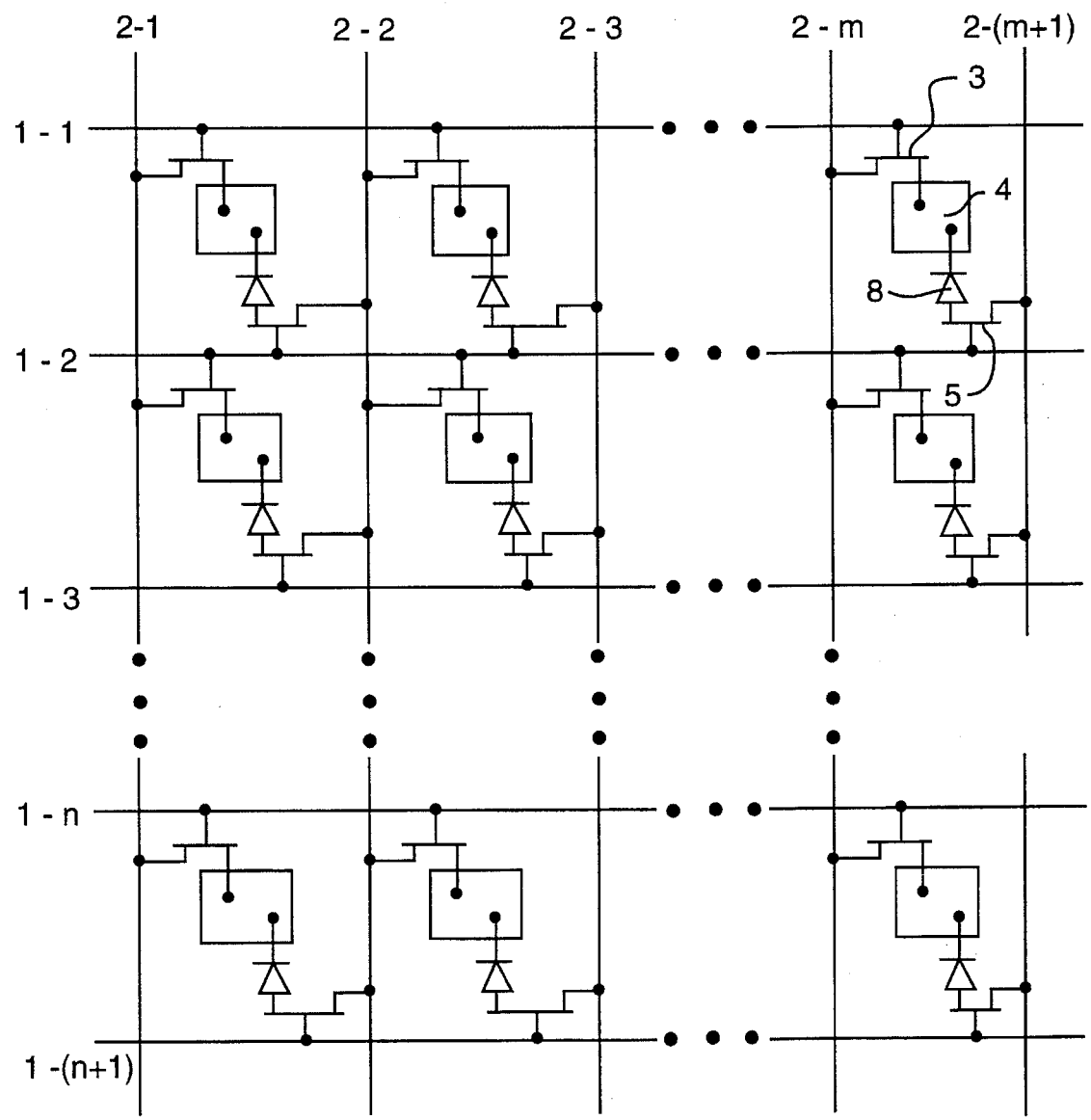
FIG. 10 is the circuitry for an active matrix circuit according to a second embodiment of the present invention.

FIG. 10 shows the circuitry for an active matrix circuit LCD according to a second embodiment of the present invention. The active matrix of FIG. 10 is different from that of FIG. 5, in that the display electrode 4 of the picture element of is coupled to a first set of adjacent address (1-1) and data (2-m) buses through the first TFT 3 and to a set of adjacent address (1-2) and data (2-(m+1)) buses through the second TFT 5 and the diode 8. More specifically, the drain of the second TFT 5 of FIG. 10 is connected to data bus 2-(m+1), rather than to the first data bus 2-m as in FIG. 5. This improves the operational reliability because if any of the data buses 2-m, 2-(m+1) becomes defective, the TFT connected to the defective data bus can be removed from the defective data bus without affecting the operability of the associated picture element. The separation can be performed by means of laser trimming, chemical etching and mechanical processing. The active matrix of FIG. 10 operates in a similar manner as the matrix of FIG. 5, and the manufacture process is also similar to that shown in FIG. 9.

In the active matrix of the present invention, a diode is included between the display electrode and the source (or alternatively drain) of the second switching transistor, that is, the diode is included between the liquid crystal cell capacitor and the parasitic capacitor formed between the gate and source of the TFT. The polarity of the diode is chosen such that if the voltage at the display electrode is less than the video signal voltage at the data bus, the liquid crystal cell capacitor is charged to the video signal voltage; however, liquid crystal cell capacitor is prevented from discharging to the voltage associated with the capacitance between the gate and source of the TFT. As a result, the video signal voltage at the display electrode does not change even when the second TFT 5 is deactivated.

It will be apparent to those skilled in the art that various modifications and variations can be made in the camera and method of the present invention without departing from the spirit or scope of the invention. Thus, it is intended that the present invention cover the modifications and variations of this invention provided they come within the scope the appended claims and their equivalents.

What is claimed is:

1. An active matrix for liquid crystal displays having a plurality of picture elements arranged in the matrix, a plurality of address buses arranged in rows of the matrix and supplied with an address signal having a high signal level and a low steady state signal level, and a plurality of data buses orthogonal to the address buses, each of said picture elements comprising:

at least one display electrode means;

a first switching means coupled between said display electrode means and a first respective one of the address buses and a respective one of the data buses;

a second switching means coupled between said display electrode means and a second respective one of the address buses and said respective data bus; and means, coupled between said second switching means and in series with said display electrode means, for preventing said display electrode means from discharging and maintaining a substantially constant voltage at the display electrode means during the time when the address signal changes from the high signal level to the low steady state signal level.

2. The active matrix of claim 1, wherein said preventing means includes a diode.

3. The active matrix of claim 2, wherein said diode includes a Schottky diode.

4. The active matrix of claim 2, wherein said diode includes a MIS (Metal Insulator Semiconductor) transistor having its drain gate connected to one another.

5. The active matrix of claim 2, wherein said second switching element includes a thin film transistor having a drain coupled to said respective data bus, a gate to said second address bus, and a source to one end of said diode, and wherein another end of said diode is connected to the display electrode in a manner for preventing said display electrode from discharging whereby a substantially constant voltage is maintained at the display electrode during the time when the address signal changes from the high level to the low level.

6. The active matrix of claim 2, wherein said second switching element includes a thin film transistor having a source coupled to said respective data bus, a gate to said second address bus, and a drain to one end of said diode, and wherein another end of said diode is connected to the display electrode in a manner for preventing said display electrode from discharging whereby a substantially constant voltage is maintained at the display electrode during the time when the address signal changes from the high level to the low level.

7. The active matrix of claim 5 or 6, wherein said thin film transistor includes a MIS (Metal Insulator Semiconductor) transistor.

* * * * *